United States Patent [19]

Tsuruta et al.

[11] Patent Number: 4,796,244

[45] Date of Patent: Jan. 3, 1989

[54] DISC PLAYER

[75] Inventors: Yukiyasu Tsuruta, Kadoma; Saburo Yorizane, Osaka; Koichiro Kimura, Kyoto; Tetsuo Noda, Ikoma; Taizo Isshiki, Daito; Masanori Okada, Nishinomiya; Masato Ishihara, Nagoya, all of Japan

[73] Assignee: Sanyo Electric Co., Ltd., Osaka, Japan

[21] Appl. No.: 163,913

[22] Filed: Mar. 3, 1988

[30] Foreign Application Priority Data

Mar. 4, 1987 [JP] Japan .................................. 62-49506
Oct. 29, 1987 [JP] Japan ........................... 62-165605[U]

[51] Int. Cl.$^4$ ......................... G11B 17/28; G11B 5/48
[52] U.S. Cl. .................................................... 369/38
[58] Field of Search ............................. 369/34, 36, 38

[56] References Cited

U.S. PATENT DOCUMENTS

| | | | |
|---|---|---|---|
| 4,561,078 | 12/1985 | Nakayama | 369/38 |
| 4,653,037 | 3/1987 | Nakayama et al. | 369/38 |
| 4,691,309 | 9/1987 | Suzuki | 369/38 |
| 4,730,291 | 3/1988 | Ikedo et al. | 369/36 |

Primary Examiner—Steven L. Stephan
Attorney, Agent, or Firm—Armstrong, Nikaido, Marmelstein & Kubovcik

[57] ABSTRACT

A disc player comprising a lift chassis 5 liftably supported on a main chassis 1 and having a signal reproduction unit 31 mounted thereon, and a drive slide 9 supported by the main chassis 1 and movable in a direction intersecting the direction of movement of the lift chassis 5. The drive slide 9 has a straight cam portion in engagement with a cam follower on the lift chassis 5 for reciprocatingly driving the lift chassis 5. An intermittent feed mechanism is provided between the drive slide 9 and a motor 23 for reciprocatingly moving the drive slide. The feed mechanism comprises a drive portion for receiving a torque directly from the motor, and a driven portion to be intermittently driven by the drive portion while the drive portion is in continuous rotation. The power given to the driven portion is delivered to the drive slide to thereby move the slide stepwise. The drive portion has an engaging portion which, while the drive slide is at rest, engages with the driven portion to lock the drive slide, whereby the reproduction unit can be held properly in position.

17 Claims, 18 Drawing Sheets

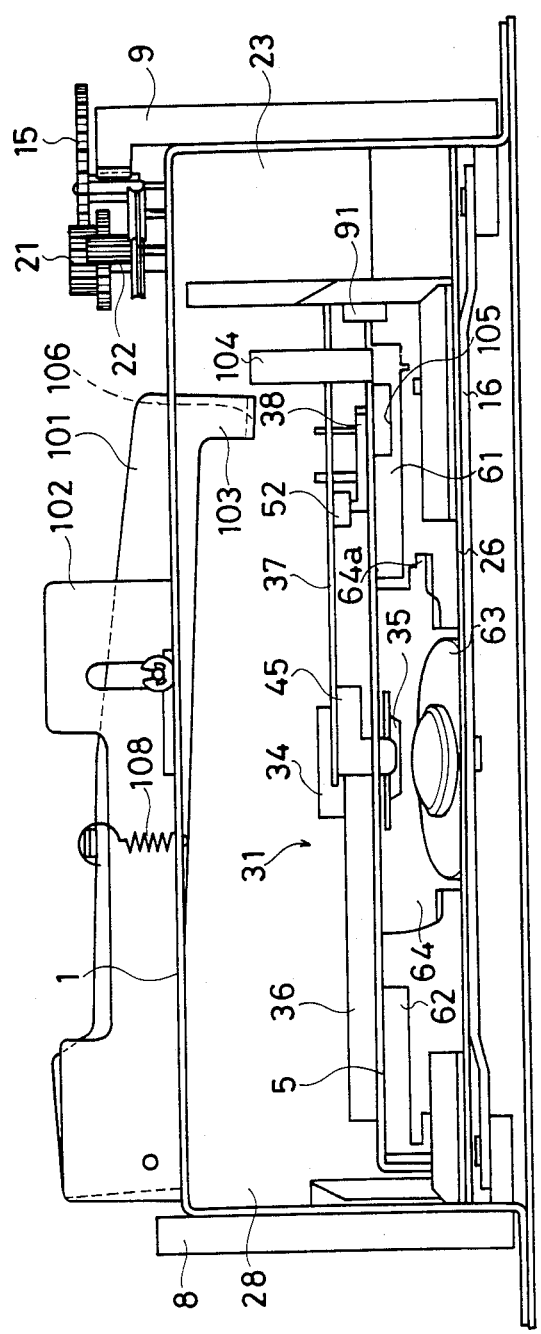

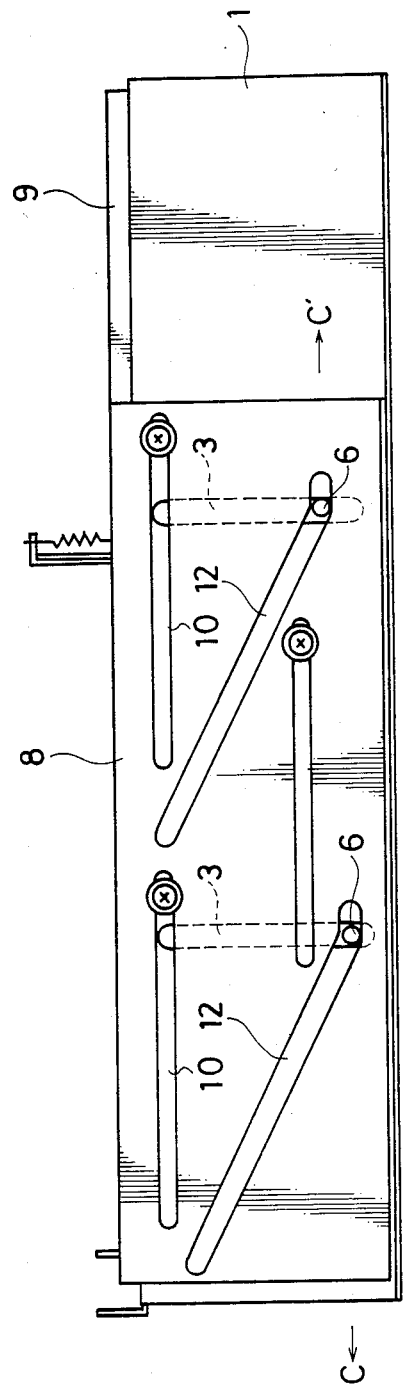

ic player having a drive mechanism for raising a sig-
DISC PLAYER

FIELD OF THE INVENTION

The present invention relates to a disc player for use with a plurality of discs having signals recorded thereon for selecting one of the discs and reproducing the recorded signals therefrom, and more particularly to a disc player having a drive mechanism for raising a signal reproduction unit to the position where the disc to be played is accommodated.

BACKGROUND OF THE INVENTION

Disc players heretofore known include those wherein a tray box is removably mounted on the main chassis of the player main body. The tray box has accommodated therein a plurality discs as individually placed on trays arranged in a multiplicity of stages. The desired one of the discs is horizontally withdrawn from the tray box along with the tray and set in the signal reproduction unit within the player main body. At this time, the reproduction unit including a turntable and a pickup is raised to the level of the withdrawn disc and reproduces the signals at this level.

FIG. 21 shows a drive mechanism proposed for raising the reproduction unit to a specified level (Unexamined Japanese Patent Publication SHO No. 61-261851).

This mechanism comprises a lift chassis 5 having the reproduction unit (not shown). The lift chassis 5 is movable upward and downward stepwise, whereby the reproduction unit is positioned as opposed to the desired disc D within a tray box 27. The lift chassis 5 is driven by drive slides 109 formed with steplike slanting grooves 110, 110.

The lift chassis 5 is accommodated in a main chassis 1 with vertical grooves 112, 112 formed in its side plates. Each drive slide 109 is disposed along the side plate, and the slanting groove 110 includes horizontal portions and slanting portions. Each of pins 6, 6 projecting from the side plate of the lift chassis 5 is inserted through the vertical groove 112 and the slanting groove 110 at the intersection thereof. Accordingly, when the drive slides 109 are moved rightward or leftward by driving a motor 111, the pins 6 are pushed by the slanting grooved portions 110 of the drive slides 109, whereby the lift chassis 5 is moved stepwise upward or downward.

The slanting groove 110 comprises the horizontal and slanting portions and has a zigzag shape to render the lift chassis 5 properly positionable at rest at different levels. The above mechanism therefore has the problem that when the pin 6 shifts from the horizontal portion to the slanting portion with the movement of the drive slide 109, the motor 111 is subjected to an abruptly increased load, failing to smoothly move the lift chassis 5. Furthermore, the horizontal portions, included in the slanting groove 110 and not contributing to the ascent or descent of the lift chassis 5, give an increased horizontal dimension to the drive slide 109 and add to the stroke length of the drive slide 109. The mechanism therefore has the problem of making the disc player large-sized.

SUMMARY OF THE INVENTION

The main object of the present invention is to provide a disc player which comprises a drive slide having a straight slanting groove so as to render the lift chassis smoothly movable and in which the lift chassis is nevertheless properly retainable at the level of the desired one of discs arranged in a multiplicity of stages, the drive slide having a decreased dimension in the direction of its sliding movement to give the player a smaller dimension in the same direction.

The present invention provides a disc player which comprises a lift chassis 5 liftably supported on a main chassis 1 and having a signal reproduction unit 31 mounted thereon, and a drive slide 9 supported by the main chassis 1 and movable in a direction intersecting the direction of movement of the lift chassis 5. The drive slide 9 is formed with a straight cam portion in engagement with a cam follower provided on the lift chassis 5 for driving the lift chassis 5 upward or downward. An intermittent feed mechanism is provided between the drive slide 9 and a motor 23 for reciprocatingly moving the drive slide.

The intermittent feed mechanism comprises a drive portion for receiving a torque directly from the motor, and a driven portion to be intermittently driven by the drive portion while the drive portion is in continuous rotation. The power given to the driven portion is delivered to the drive slide to thereby move the drive slide stepwise. The drive portion has an engaging portion which, while the drive slide is at rest, idly rotates in engagement with the driven portion to lock the drive slide, whereby the reproduction unit can be held properly in a specified position.

BRIEF DESCRIPTION OF THE DRAWINGS

FIG. 4 is a front view of the disc player;

FIG. 5 is a right side elevation of the disc player;

DESCRIPTION OF THE PREFERRED EMBODIMENTS

Overall Construction

Figure 1:
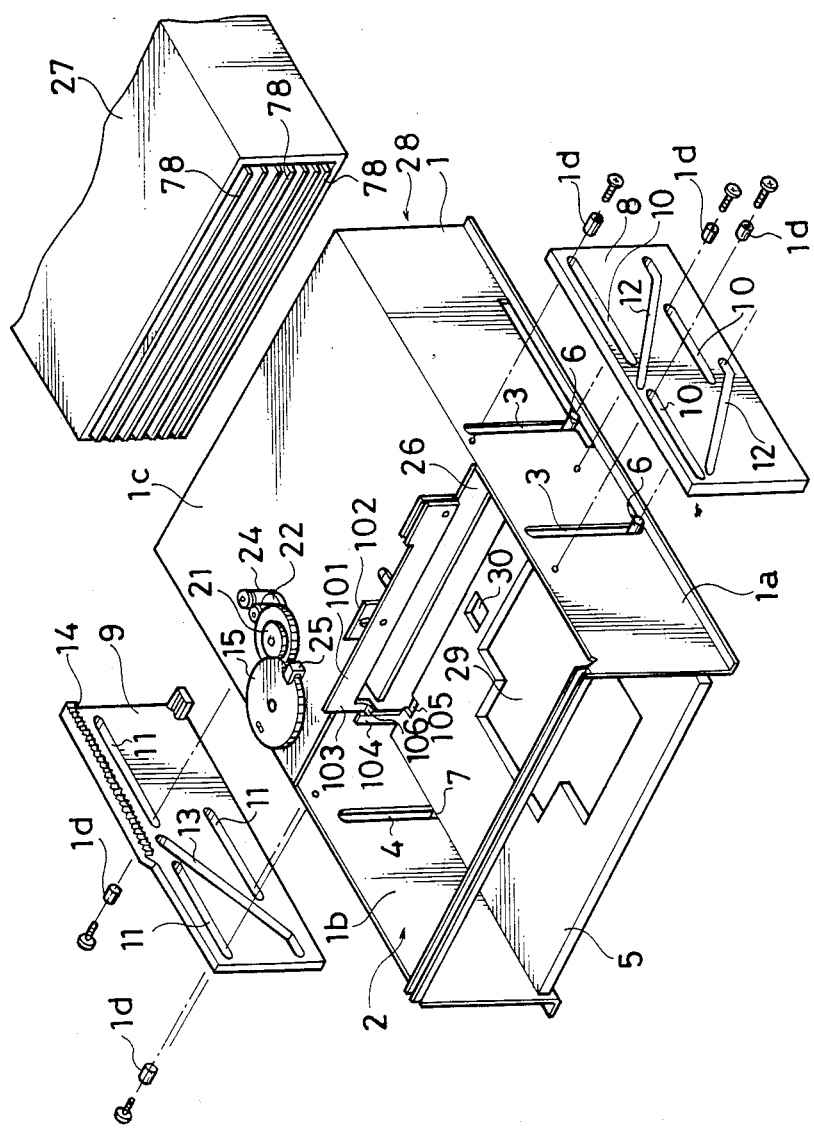
FIG. 1 is a fragmentary explosed perspective view showing a disc player embodying the invention.

With reference to FIG. 1, a main chassis 1 comprises a pair of side walls 1a, 1b, and a top wall 1c, and has a lift chassis 5 disposed in its interior space. The main chassis 1 is formed in its top wall 1c with an opening 2 opposed to the lift chassis 5, and in its side walls 1a, 1b with vertical guide slits 3, 3 and 4. The lift chassis 5 has pins 6, 6 and 7 projecting from its opposite ends and serving as cam followers. These pins 6, 6 and 7 are slidably inserted through the guide slits 3, 3 and 4 in the main chassis 1, respectively for guiding the chassis 5 for upward and downward movement.

The main chassis 1 is provided with a pair of drive slides 8, 9 along its side walls 1a, 1b. Each of the sldies 8 (9) has three horizontal slide slits 10, 10, 10 (11, 11, 11). A pipe piece 1d is inserted through each slide slit and fastened to the main chassis 1 with a screw to guide the horizontal movement of the drive slide. The drive slide 8 on the right side of the main chassis is formed with a pair of slanting slits 12, 12 extending downward from the opening (2) side. The drive slide 9 on the left side of the main chassis has a single slanting slit 13 extending downward from the opening side in a direction opposite to the slits 12. These slanting slits 12, 12 add 13 provide cam portions in engagement with the cam followers. The heads of the pins 6, 6, 7 projecting from the lift chassis 5 are inserted through the slanting slits 12, 12, 13, respectively.

The lower end of each of the slanting slits 12, 12, 13 is continuous with a horizontal slit portion which does not contribute to the driving of the lift chassis 5 but serves to move a tray box discharge mechanism with the movement of the drive slide 9 as will be stated later.

A horizontally extending rack gear 14 is provided along the upper end of the left drive slide 9. A drive gear 15 mounted on the top wall 1c of the main chassis 1 is in mesh with the rack gear 14. The rack gear 14 and the drive gear 15 provide an intermittent feed mechanism as will be described later, such that the left drive slide is reciprocatingly movable stepwise by drivingly rotating the drive gear 15. As will be described later, the drive slide 9 is coupled to the other drive slide 8 by a pivotal lever, and the two drive slides 8 and 9 are driven in opposite directions to each other at the same time.

Figure 2:
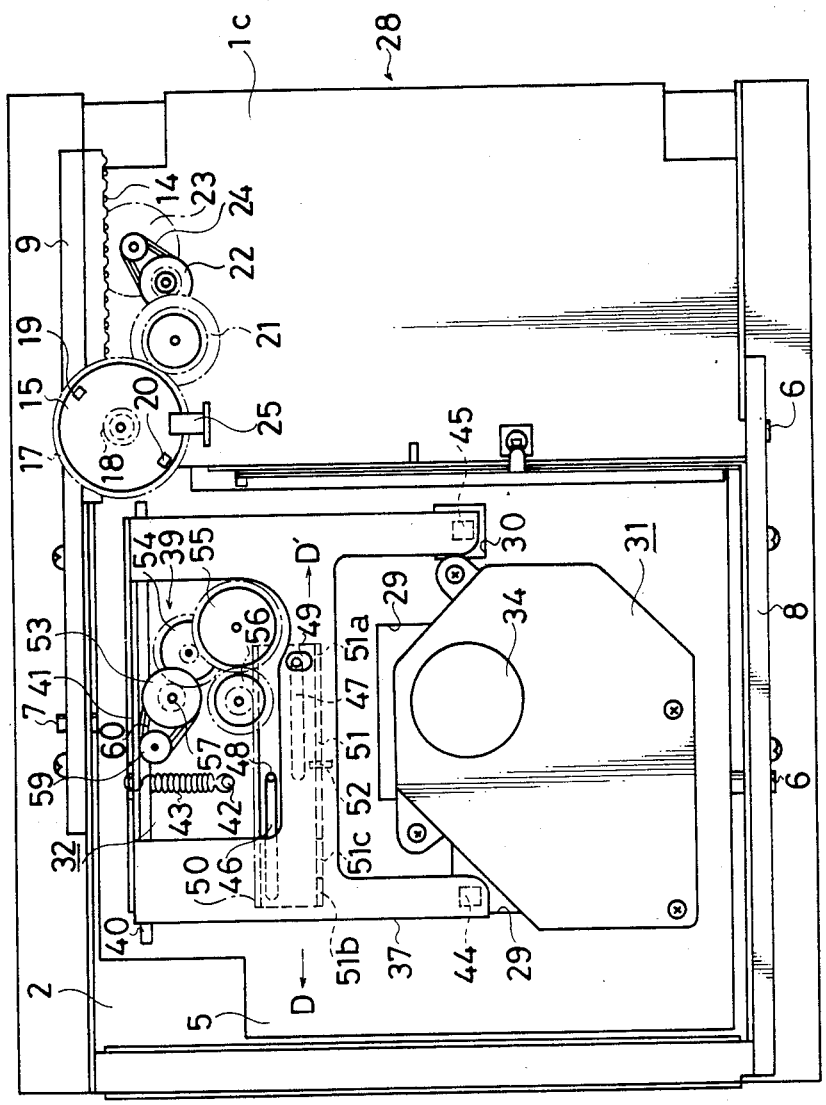
FIG. 2 is a plan view showing the disc player.

As shown in FIG. 2, the drive gear 15 has a large gear portion 17 an a small gear portion 18. The large gear portion 17 is symmetrically formed with a pair of diametrically opposed slits 19 and 20.

In the vicinity of the drive gear 15, the top wall 1c of the main chassis 1 has mounted thereon a first transmission gear 21 in mesh with the drive gear 15, a second transmission gear 22 meshing with the gear 21, and a motor 23 coupled to the gear 22 by a belt 24. The drive gear 15 is driven by the motor 23.

Intermittent Feed Mechanism

Figure 6A:
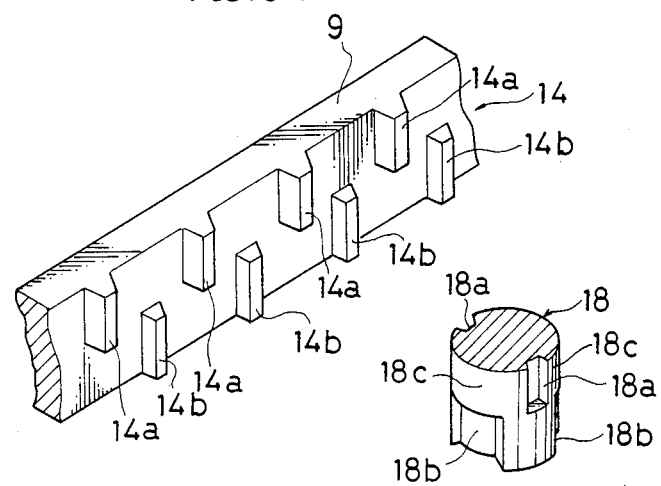
FIG. 6A is an exploded perspective view showing another intermittent feed mechanism of different construction.
Figure 6B:
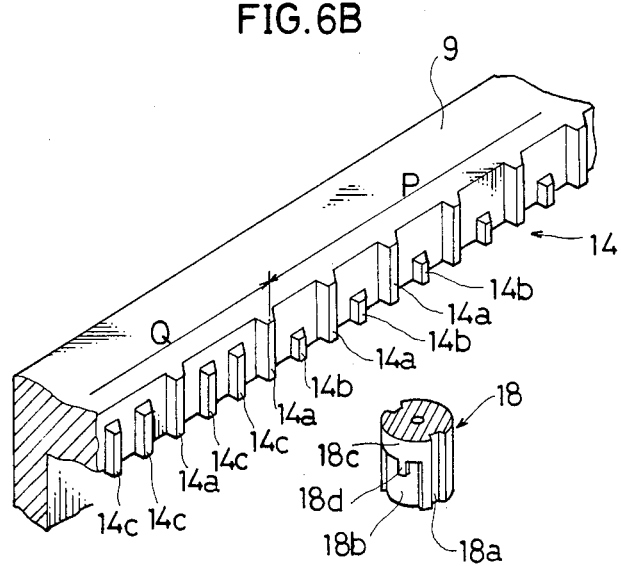
FIG. 6B is an exploded perspective view of another intermittent feed mechanism of different construction.
Figure 6:
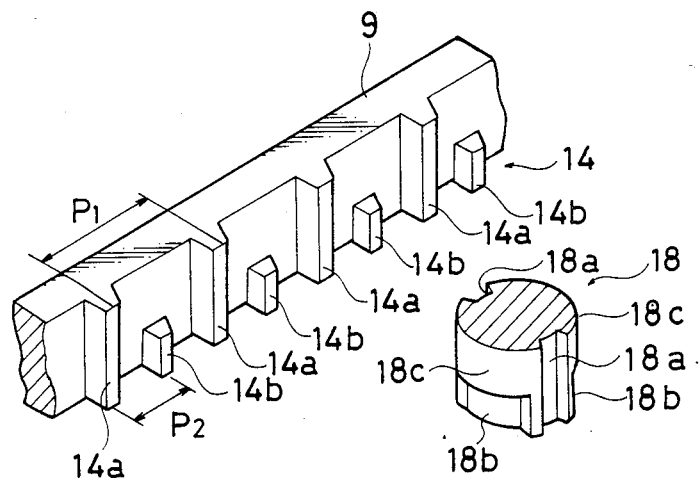
FIG. 6 is an exploded perspective view of an intermittent feed mechanism.
Figure 7:
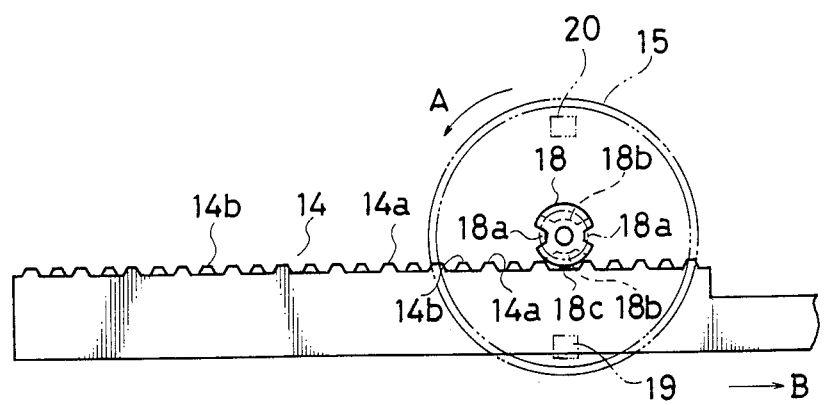
FIG. 7 is a side elevation of the intermittent feed mechanism shown in FIG. 6.

With reference to FIGS. 6 and 7, the intermittent feed mechanism for driving the drive slide 9 stepwise comprises the small gear portion 18 integral with the drive gear 15, and the rack gear 14 integral with the drive slide 9. The small gear portion 18 has a solid cylindrical body formed with a pair of diametrically opposed gear grooves 18a and 18a in its outer periphery in a symmetric arrangement. Between the two gear grooves, the axially upper half of the outer periphery provides engaging portions 18c, 18c, and the lower half thereof has a pair of cutouts 18b, 18b over a specified angular range. On the other hand, the rack gear 14 is provided with first ridges 14a having a pitch P1, and second ridges 14b having one-half the length of the first ridges 14a and the same pitch P1 and each formed between two adjacent first ridges 14a at a distance P2, i.e. one-half of the pitch P1, therefrom. With reference to FIG. 7, when the engaging portion 18c of the small gear portion 18 is in engagement with two adjacent first ridges 14a, 14a, the second ridge 14b therebetween is accommodated in the cutout 18b of the small gear portion 18.

When the drive gear 15 rotates in the direction of arrow A shown in FIG. 7, the mechanism is repeatedly subjected to an operation cycle which comprises a first drive mode wherein the side wall of the small gear portion 18 defining the gear groove 18a drives the first ridge 14a of the rack gear 14, a second drive mode wherein one of the side walls arranged circumferentially of the, portion 18 and defining the cutouts 18b drives the second ridge 14b of the rack gear 14, and an idle rotation mode for a change from the first drive mode to the second drive mode. In the first and second drive modes, the rack gear 14 is driven in the direction of arrow B. In the idle rotation mode, the second ridge 14b is accommodated in the cutout 18b and the small gear portion 18 idly rotates for a period of time until the side wall defining the cutout 18b comes into contact with the second ridge 14b, interrupting the transmission of power to the rack gear 14. In the idle rotation mode, the engaging portion 18c of the small gear portion 18 is in intimate engagement with the rack gear 14 between two adjacent first ridges 14a, 14a to lock the rack gear 14. Consequently, with the continuous rotation of the drive gear 15, the rack gear 14 intermittently moves by one pitch P1 at a time every time the drive gear 15 rotates by one-half turn.

The ridge pitch P1 of the rack gear 14 is determined according to the tray pitch of the tray box 27. More specifically, the pitch P1 is so determined that when the drive slide 9 moves by one pitch of the rack gear 14, the lift chassis 5 moves upward or downward by a distance equal to the tray pitch of the tray box 27.

As shown in FIG. 6A, the first ridges 14a and the second ridges 14b of the rack gear 14 can be in a staggered arrangement and given a length about one-half of the width of the rack gear 14. In this case, the gear grooves 18a in the small gear portion 18 are shortened in corresponding relation to the length of the first ridges 14a.

As shown in FIG. 2, an optical sensor 25 opposed to an outer peripheral portion of the drive gear 15 is mounted on the top wall 1c of the main chassis 1. The sensor 25 comprises a light-emitting element and a photodetector arranged on the opposite sides of the outer peripheral portion of the gear 15. Every time the slits 19, 20 of the drive gear 15 pass between the light-emitting element and the photodetector, i.e., every time the gear 15 rotates by one-half turn, the sensor 25 produces one electric pulse signal for detecting the number of revolutions and the rotated position of the gear 15. As shown in FIG. 7, the slits 19, 20 of the drive gear 15 are disposed on a diametrical line through the midportions of the engaging portions 18c, 18c of the small gear portion 18. The sensor 25 is so positioned as to detect the slit 20 when the drive gear 15 is in the rotated position shown in FIG. 7. Accordingly, the sensor 25 emits the pulse signal when the first drive mode changes to the idle mode, i.e., when the small gear portion 18 intermittently comes out of meshing engagement with the rack gear 14, whereby the completion of movement of the lift chassis 5 by a unit step is detected.

Further Description of Main Chassis and the Lift Chassis

With reference to FIG. 1, the top wall 1c of the main chassis 1 has a raised piece 102 at the opening 2. A restraining lever 101 pivotally movable in a vertical plane is attached to the raised piece 102. A tongue 103 having a lug 106 at its lower end extends downward from the free end of the restraining lever 101. As seen in FIG. 4, a spring 108 connected between the lever 101 and the main chassis 1 biases the lever 101 to rotate downward, causing the tongue 103 to extend into the main chassis 1 through the opening 2.

Figure 3:
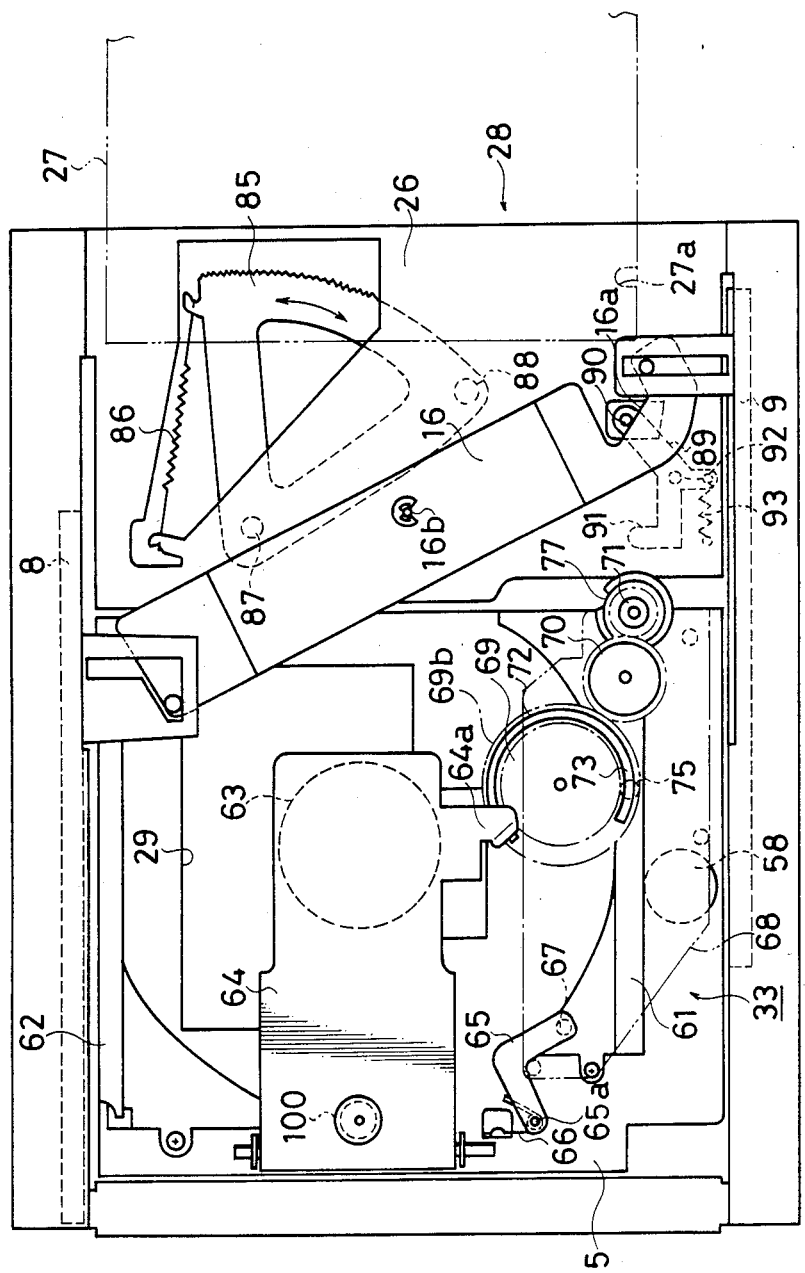
FIG. 3 is a bottom view of the disc player.

With reference to FIG. 3, the main chassis 1 is fixedly provided with a bottom plate 26, which defines an inlet 28 for the tray box 27. A pivotal lever 16 is pivotally movably supported at its center by a pin 16b on the rear side of the bottom plate 26. The pair of drive slides 8 and 9 are connected to the respective ends of the pivotal lever 16 and are thereby made movable together in directions opposite to each other as already described.

With reference to FIGS. 1 and 4, the lift chassis 5 has a central opening 29 and an aperture 30 close to the opening 29, and is formed with a projection 104 and a recessed portion 105 at its one end closer to the tray box inlet 28. The projection 104 and the tongue 103 of the restraining lever 101 act to register the front ends of trays 78 accommodated in the tray box 27. When the tray box is to be loaded, the lift chassis 5 is in its lowered position. When the tray box 27 is inserted into the inlet 28, the trays 78 are brought into contact with the projection 104 and the tongue 103, whereby the front ends of the trays 78 are registered with one another. During the latter half of the rise of the lift chassis 5, the recessed portion 105 of the lift chassis 5 comes into contact with the lug 106 of the tongue 103, pivotally moving the restraining member 101 against the action of the spring 108.

Signal Reproduction Unit

With reference to FIGS. 2 and 4, the signal reproduction unit 31 is mounted on the top of the lift chassis 5 and comprises a spindle motor 34, a turntable 35 fixed to the output shaft of the motor 34 and a pickup 36. The turntable 35 and the pickup 36 are projected downward from the opening 29 of the lift chassis 5.

Disc Loading Assembly

As shown in FIG. 3, the lift chassis 5 is provided with a disc loading assembly 33 for drawing the desired tray 78 from the tray box 27 and setting the disc on the tray 78 in position on the reproduction unit 31. As will be described below, the disc loading assembly 33 comprises a tray transport mechanism and a disc clamp mechanism.

(Tray Transport Mechanism)

Figure 8:
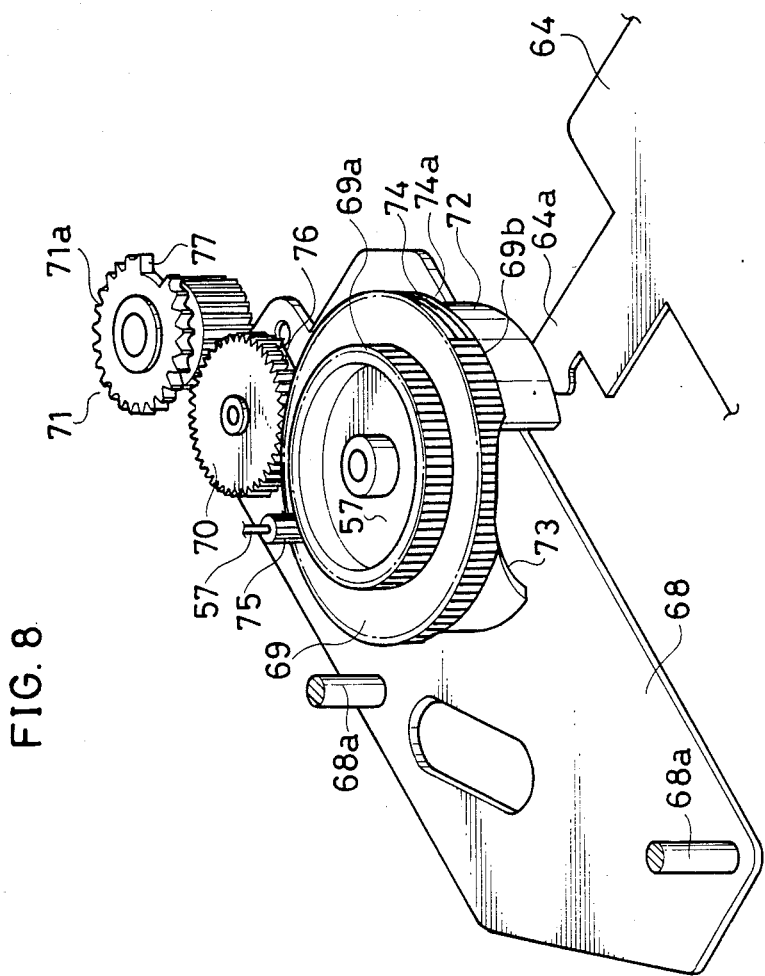
FIG. 8 is a perspective view of a tray transport mechanism.

With reference to FIGS. 3 and 8, a support chassis 68 is disposed below the lift chassis 5 at a given distance from the rear side of the chassis and is fixed to the lift chassis 5 by a plurality of posts 68a. Cam gear means 69, a transmission gear 70 and a feed gear 71 are mounted on the upper side of the support chassis 68. The cam gear means 69 has a small gear 69a, a large gear 69b and a peripheral wall 72 in the form of a hollow cylinder and projecting from the lower side of the large gear 69b. The peripheral wall 72 is partly cut out obliquely to provide a cam portion 73. A projection 64a of the clamp lever 64 to be described later is in sliding contact wihh the peripheral wall 72 of the cam gear means 69 to regulate the angle of rotation of the clamp lever 64.

The large gear 69b is toothed only over a specified angular range about its axis and is provided over the remaining angular range with a small-diameter hollow cylindrical portion 7 having the same diameter as the root circle of the large gear 69b and with a large-diameter hollow cylindrical portion 74a having the same diameter as the addendum circle of the gear 69b adjacent the portion 74.

The small gear 69a of the cam gear means 69 is in mesh with a drive gear 75 for drivingly rotating the cam gear means 69. The rotation of the motor 58 to be described below is transmitted to the cam gear means 69 through the gear 75.

The transmission gear 70 meshing with the large gear 69b of the cam gear means 69 has a toothless portion 76 over a specified angular range about its axis over the lower half of its thickness. As will be described later, the engagement of the large-diameter cylindrical portion 74a of the cam gear means 69 with the toothless portion 76 locks the transmission gear 70.

Figure 10:
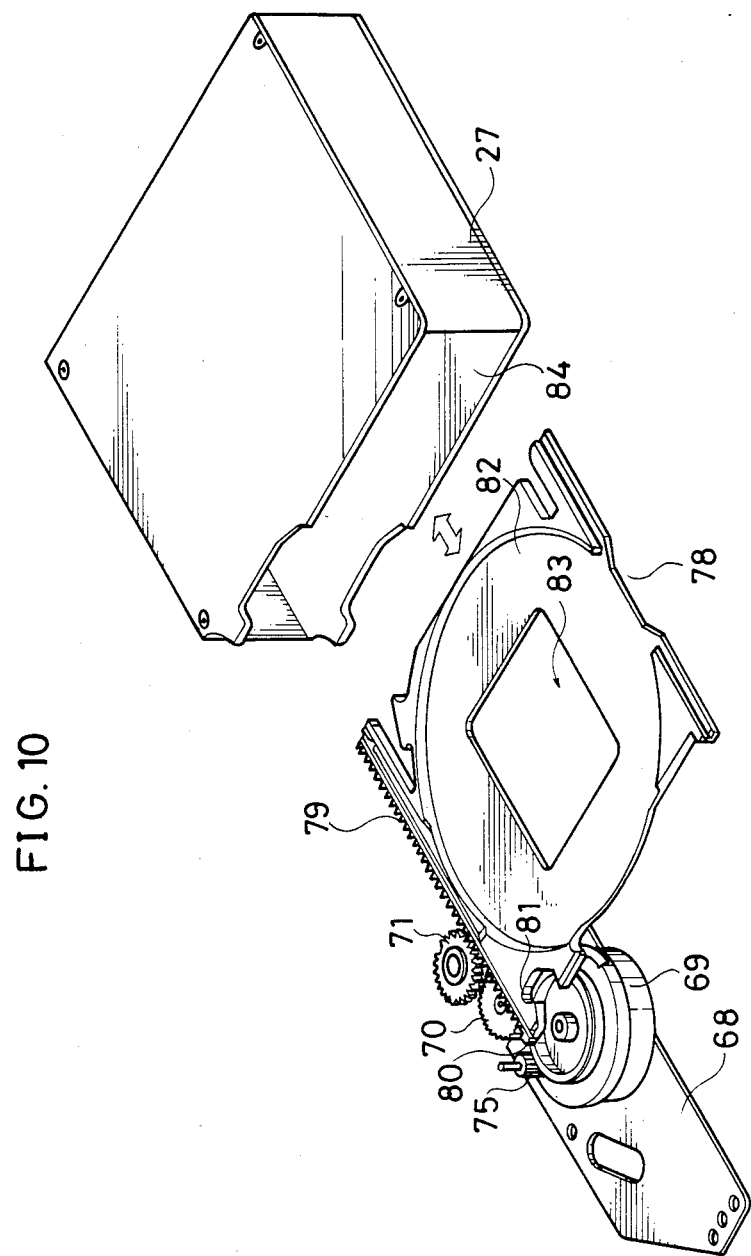
FIG. 10 is a perspective view showing a tray box and the tray in engagement with the tray transport mechanism.

With reference to FIG. 10, the tray 78 for placing a disc thereon has a rack gear 79 extending along one side thereof and provided with a projection 80 at its left end. The tray 78 has a hooked portion 81 at its front end and a disc accommodating portion 82 formed with a central opening 83.

Figure 11:
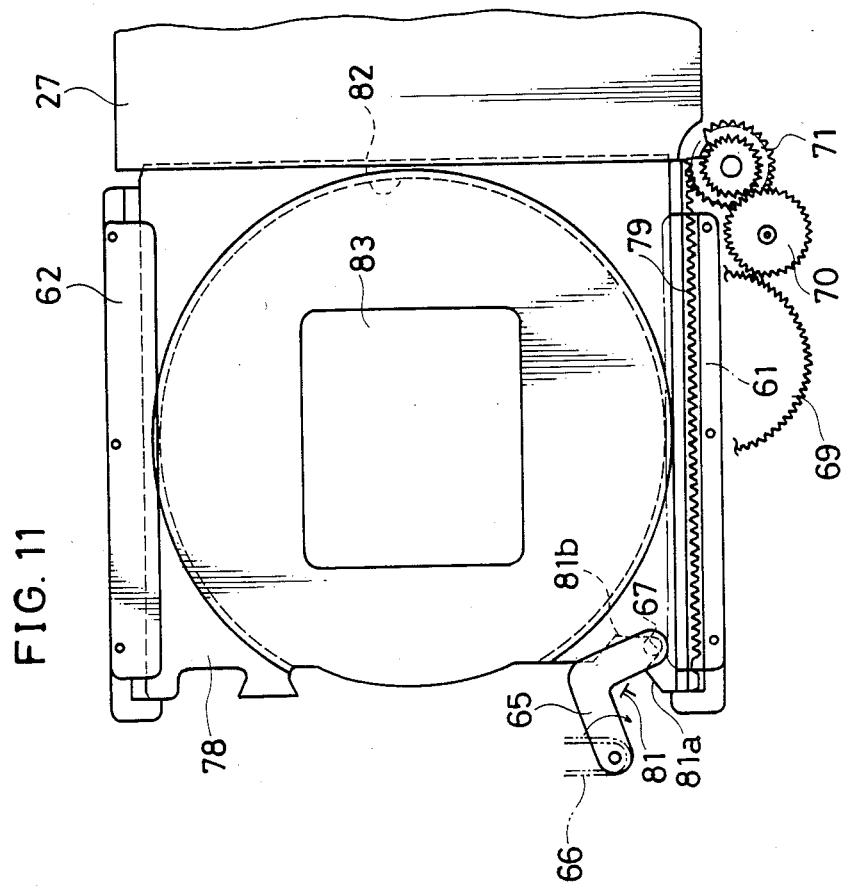
FIG. 11 is a plan view showing the tray as completely transported.

As seen in FIGS. 3 and 11, the lift chassis 5 has a pair of parallel guide members 61 and 62 spaced apart by a distance corresponding to the width of the tray and each formed with a guide groove for guiding the movement of the tray.

Accordingly, by reciprocatingly driving the rack gear 79 with the feed gear 71, the tray 78 can be horizontally withdrawn from the tray box 27 through an opening 84 or placed into the box 27 while being guided by the guide members 61, 62 as seen in FIG. 10.

(Disc Clamp Mechanism)

Figure 12:
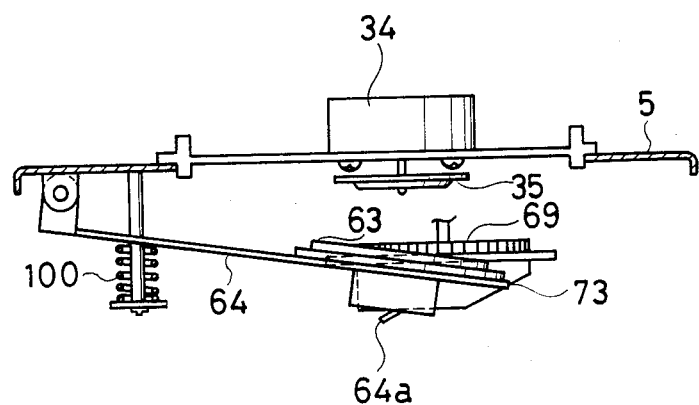
FIG. 12 is a side elevation showing the relation between a turntable and a clamp lever.

With reference to FIGS. 3 and 12, a clamp lever 64 is pivotally movably supported on the rear side of the lift chassis 5 and is positioned at the midportion between the guide members 61, 62. The lever 64 is biased upward by a spring 100 bearing thereon and supported by the chassis 5. The clamp lever 64 is provided on its free end with a clamp member 63 opposed to the turntable 35. As already stated, the clamp lever 64 has the projection 64a in sliding contact with the peripheral wall 72 of the cam gear means 69 (see FIG. 8).

Tray Positioning Mechanism

With reference to FIGS. 3 and 11, an L-shaped positioning member 65 is supported by a pivot 65a on the lift chassis 5 at the inner portion thereof toward the direction of feed of the tray so as to set the tray in position in the inner portion of the player. The member 65 is biased clockwise by a spring 66 and has a free end with a pin 67 projecting upward therefrom. As will be described later, the pin 67 engages with the tray 78 immediately before the completion of feed of the tray, pushing the tray toward the specified set position thereof for positioning.

Disc Slipping Preventing Mechanism

Figure 9:
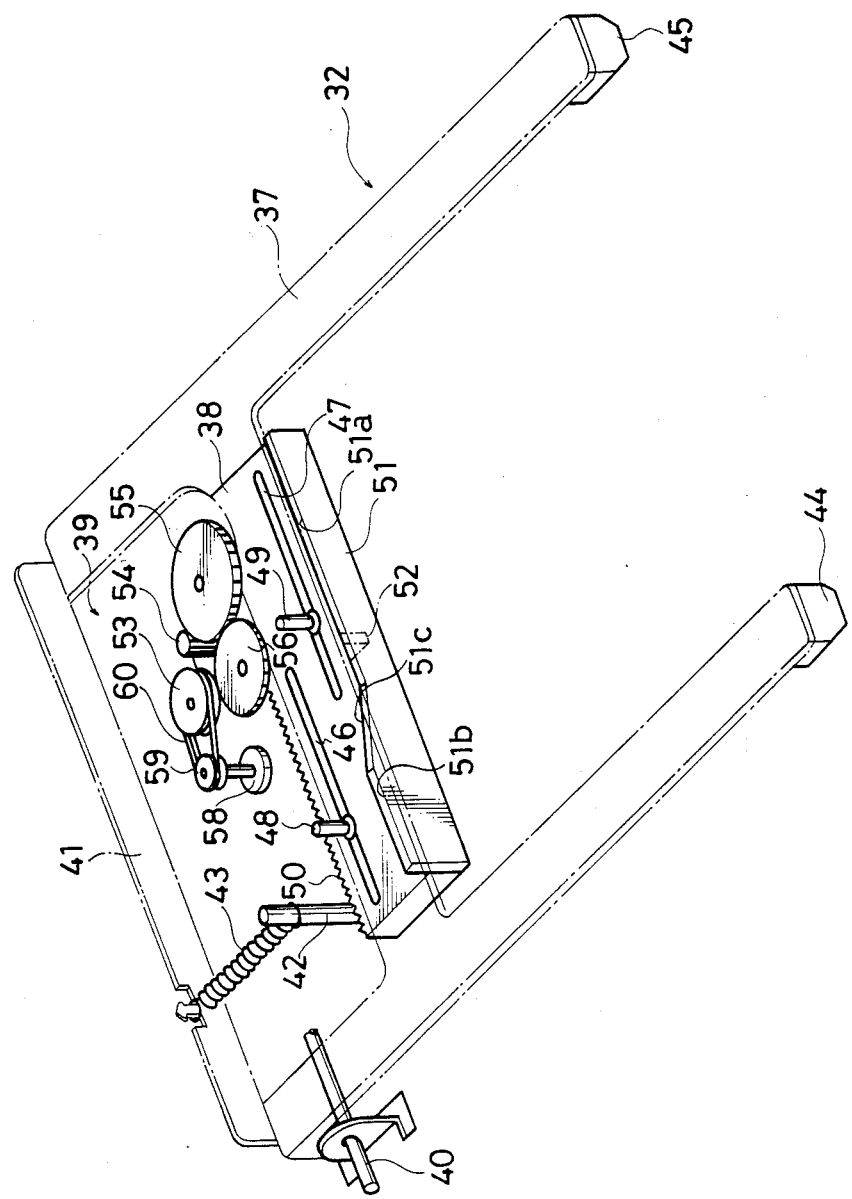
FIG. 9 is a perspective view of a mechanism for preventing a disc from slipping off.

The lift chassis 5 is provided on its upper side with a mechanism 32 for preventing the disc from slipping off. As shown in FIGS. 2 and 9, this mechanism comprise a pivotal chassis 37, a cam slide 38 and a drive gear assembly 39.

The pivotal chassis 37 is movably supported on a rod 40 supported on the lift chassis 5. A spring 43 is connected between a projection 41 formed at the base end of the pivotal chassis 37 and an upright pin 42 on the lift chassis 5 for biasing the pivotal chassis 37 in a direction toward the lift chassis 5. The pivotal chassis 37 has bifurcated ends carrying a pair of holding members 44, 45 projecting downward therefrom into the lift chassis 5 through the opening 29 and the aperture 30, respectively. The pivotal chassis 37 is further provided on its lower side with a projection 52 opposed to the cam slide 38.

The cam slide 38 has a pair of slits 46, 47 extending longitudinally thereof. A pair of pins 48, 49 extending upright from the lift chassis 5 are inserted through the slits 46, 47, respectively, for guiding the cam slide 38 for reciprocal movement in directions along the rod 40 for the chassis 37. A rack gear 50 and a ridge 51 are formed on the respective longitudinal opposite sides of the cam slide 38. The ridge 51 comprises a low portion 51a, a high portion 51b and a slanting portion 51c interconnecting these portions. The projection 52 on the pivotal chassis 37 is in sliding contact with the top end face of the ridge 51 to regulate the angle of pivotal movement of the chassis 37.

The drive gear assembly 39 comprises a pulley 53, transmission gears 54, 55 and a drive gear 56 mounted on respective shafts on the lift chassis 5. The drive gear 56 is in mesh with the rack gear 50 of the cam slide 38. The pulley 53 is coupled by a belt 60 to a pulley 59 fixed to the output shaft of a motor 58, whereby the rotation of the motor 58 is transmitted to the cam slide 38. The shaft 57 extending downward from the center of the pulley 53 extends through the lift chassis 5 to the rear side thereof and connected to the gear 75 of the tray transport mechanism provided on the rear side of the lift chassis 5 as already stated (see FIG. 8).

Tray Box Lock Mechanism and Discharge Mechanism

With reference to FIG. 3, a pivotal lever 85 carrying an operating pin 88 to be brought into contact with the tray box 27 is supported by a pivot 87 on the upper side of the main chassis bottom plate 26 and biased counterclockwise by a spring 86 connected between the lever 85 and the bottom plate 26.

Further a lock lever 89 is supported by a pivot 92 on the bottom plate 26 and biased clockwise by a spring 93 connected between the bottom plate 26 and the lever 89. The lock lever 89 has an engaging portion 91 projecting from one free end thereof and engageable in a recessed portion 27a in the tray box 27, and a pin 90 projecting from the other free end thereof and movable by a cam face 16a on the pivotal lever 16.

When the tray box 27 is inserted into the player through the inlet 28, the front end of the tray box 27 comes into contact with the operating pin 88. As the tray box 27 is further pushed in against the spring 86, the lock lever 89 is slightly rotated counterclockwise by being pushed by the box 27. When the tray box 27 is set in position, the engaging portion 91 engages in the recessed portion 27a in the tray box 27 to lock the box 27 in its set position.

When the tray box is dischared, counterclockwise movement of the pivotal lever 16 causes the cam face 16a to push the lock lever 89 counterclockwise, moving the engaging portion 91 out of the box recessed portion 27a. The tray box 27 thus unlocked is pushed out of the player by the operating pin 88 on the pivotal lever 85 which is biased counterclockwise by the spring 86.

The foregoing mechanisms operate in sequence as will be described below.

Selecting the Disc

With the lift chassis 5 in its lowermost position, the tray box 27 is loaded into the main chassis 1 through the inlet 28 and locked to the main chassis 1 by the lock mechanism described above.

Figure 13:
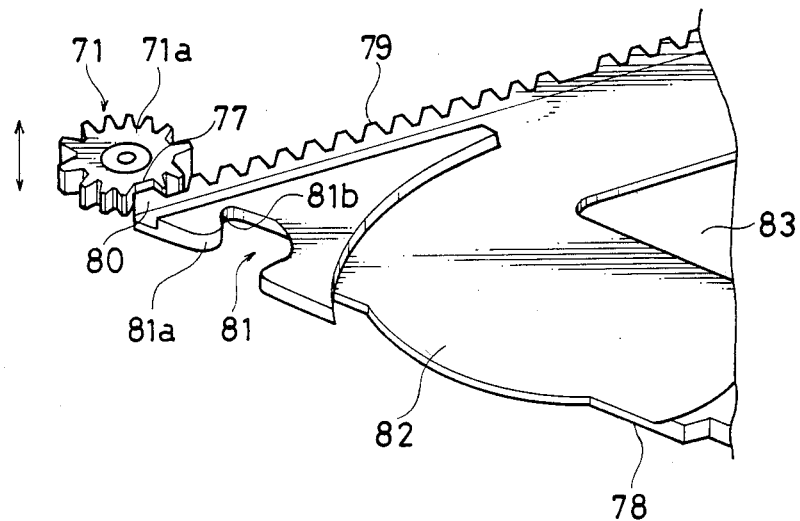
FIG. 13 is a perspective view showing a feed gear and the tray in engagement therewith.
Figure 14:
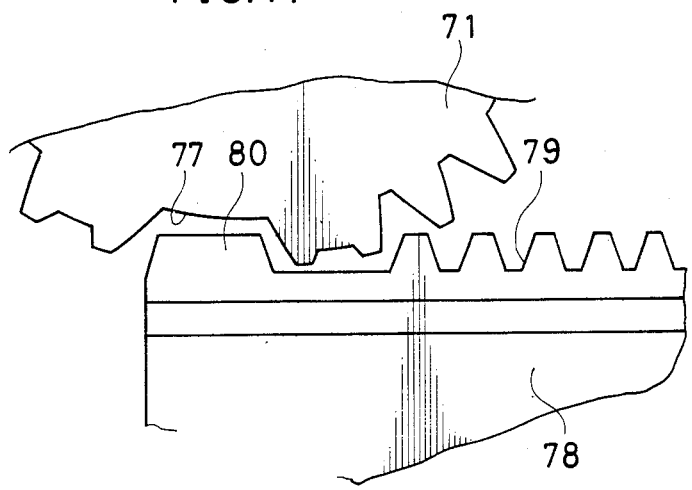
FIG. 14 is an enlarged fragmentary plan view of FIG. 13.
Figure 15:
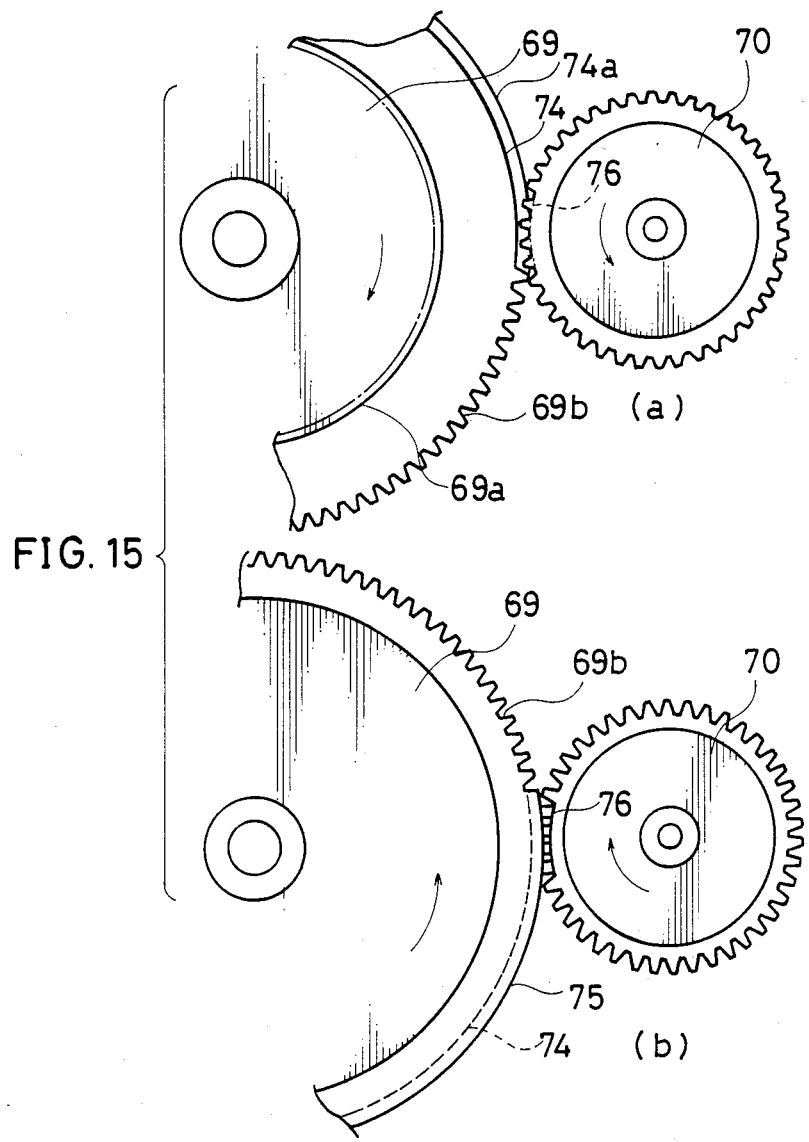
FIGS. 15 (a) and (b) are a plan view and a rear view showing a transmission gear at the moment when it is released from meshing engagement with a large gear of cam gear means.

Suppose the operator manipulates a switch to feed an instruction signal to the system controller, specifying the disc in the lowermost position within the tray box 27 for signal reproduction. Under the control of the system controller, the motor 23 is energized, rotating the drive gear 15 by the first one-half turn and thereby raising the lift chassis 5 by one step, whereupon the motor 23 is deenergized in response to a pulse signal from the sensor 25. Consequently, the projection 80 at the front end of the lowermost tray 78 is engaged by a toothless portion 77 of an upper gear 71a on the feed gear 71 mounted on the lift chassis 5 as seen in FIGS. 13 and 14.

The operation to select the disc in the second or higher stage will be described later.

Feeding the Tray

With the lowermost tray 78 thus selected, the motor 58 shown in FIG. 9 is energized in response to the pulse signal from the sensor 25, whereby the cam gear means 69 is initiated into clockwise rotation from the state shown in FIG. 8. The rotation is transmitted via the transmission gear 70 to the feed gear 71, which in turn is driven clockwise.

With the toothless portion 77 of the feed gear 71 in engagement with the projection 80 of the tray 78 at this time, the rotation of the feed gear 71 withdraws the tray 78 from the tray box 27 and transports the tray to the specified position in the inner portion of the player along the guide members 61, 62 on the bottom of the lift chassis 5 as seen in FIG. 11.

During the travel of the tray 78, the projection 64a of the clamp lever 64 is disengaged from the cam portion 73 of the cam gear means 69, whereby the clamp lever 64 is retained as pivotally moved in a direction opposite to the biasing direction. Thus, the clamp member 63 is at a sufficient distance away from the turntable 35.

Upon the tray 78 reaching the terminal end of the feed path, the toothless portion 76 of the transmission gear 70 comes into engagement with the large-diameter cylindricl portion 74a of the cam gear means 69, with the toothed portion of the gear 70 above the toothless portion 76 thereof facing the small-diameter cylindrical portion 74 of the cam gear means 69 as shown in FIGS.

Figure 16:
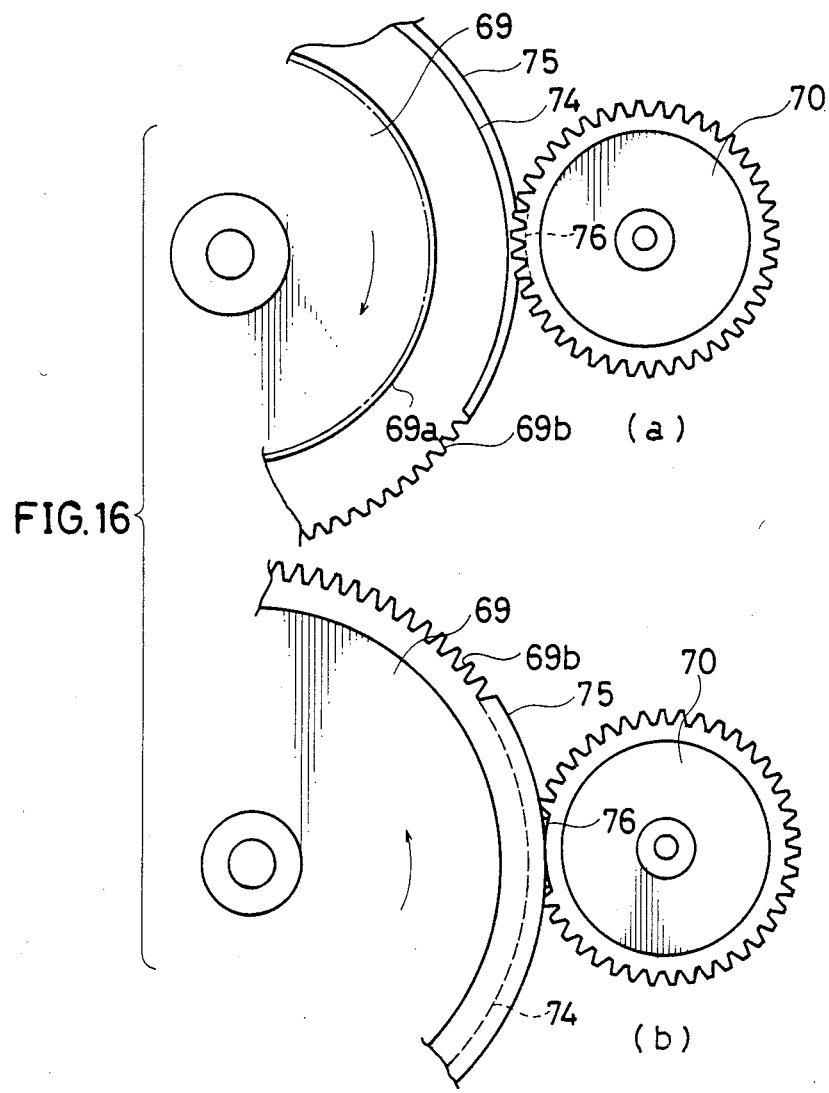
FIGS. 16 (a) and (b) are a plan view and a rear view showing the cam gear means as further rotated from the state of FIGS. 15 (a) and (b) to lock the transmission gear.

15 (a) and (b). Consequently, transmission gear 70 no longer rotates despite further rotation of the cam gear means 69 but is locked by the engagement of the toothless portion 76 with the cylindrical portion 74a as seen in FIGS. 16 (a) and (b). Thus, the tray 78 is completely fed by the feed gear 71.

Immediately before the completion of the above feed operation, a bevel face 81a of the hooked portion 81 of the tray 78 shown in FIG. 11 comes into contact with the pin 67 on the positioning member 65. Further travel of the tray 78 to the terminal end rotates the positioning member 65 against the spring 66, eventually causing the pin 67 to pass over the bevel face 81a and fit in an engaging portion 81b of the hooked portion 81. During the engagement of the pin 67 in the engaging portion 81b, the tray 78 is further pushed in by the force of the spring 66, precluding the feed gear 71 from backlashing relative to the rack gear 79. As a result, the tray 78 is positioned in place, whereby the tray feeding operation is completed.

Clamping the Disc

Immediately after the tray 78 has been completely fed, the projection 64a of the clamp lever 64 shown in FIG. 12 reaches the cam portion 73 of the cam gear means 69. As the cam portion 73 moves with a further rotation of the cam gear means 69, the clamp lever 64 is pivotally moved upward by the action of the spring 100, thereby raising the clamp member 63. At this time, the clamp member 63 is projected upward through the central opening 83 of the tray 78 which is positioned above the clamp member 63, whereby the disc on the tray 78 is raised off the tray by the clamp member 63 and pressed against the turntable 35.

Consequently, the disc is clamped between the turntable 35 and the clamp member 63 and made rotatable with the turntable 35.

Preventing the Disc from Slipping off

The disc is prevented from slipping off by the mechanism 32 as described below.

In the initial state shown in FIG. 2 before the tray feed operation, the cam slide 38 is in the terminal position of its movement in the direction of arrow D. At this time, the projection on the pivotal chassis 37 is in sliding contact with the low portion 51a of the ridge 51 of the cam slide 38 shown in FIG. 9, with the holding members 44, 45 projecting downward beyond the lift chassis 5 through the opening 29 and the aperture 30.

When the motor 58 is initiated into operation from this state for starting the disc feed operation, the rotation of the motor 58 is delivered via the pulley 53 and the transmission gears 54, 55 to the drive gear 56, which in turn drives the cam slide 38 in the direction of arrow D'. The projection 52 of the pivotal chassis 5 slides along the low portion 51a of the cam slide 38, with the holding members 44, 45 held projected downward beyond the lift chassis 5 until the projection 52 reaches the slanting portion 51c of the ridge 51. The projection reaches the slanting portion 51c when the tray 78 is completely brought to the fed position.

During the above operation, the holding members 44, 45 held projected beyond the lower surface of the lift chassis 5 are thereby maintained slightly above the disc on the tray 78 to prevent the disc from slipping off the tray 78 as by impact.

As the cam slide 38 is thereafter further driven toward the direction of arrow D', the projection 52 is raised by the slanting ridge portion 51c, moving the pivotal chassis 37 against the spring 43 to raise the holding members 44, 45. With this movement, the disc clamping operation proceeds, such that the rise of the holding members 44, 45 permits the clamp member 63 to raise the disc.

After the disc has been completely clamped as above, the reproduction unit 31 operates for the reproduction of signals.

After the disc has been played for reproduction, the disc is returned to the tray box 27 by a procedure reverse to the above.

When the lift chassis 5 is at the level corresponding to the lowermost tray as stated above, the sixth disc from the lowermost position, for example, is selected by the following operation.

First, the motor 23 is driven to rotate the drive gear 15 and thereby raise the lift chassis 5 stepwise. During this movement, the number of pulse signals from the sensor 25 is counted by the system controller, and when five pulses have been counted up, the motor 23 is deenergized. Consequently, the lift chassis 5 is raised by five steps and positioned at the level for the sixth tray. During this operation, the toothless portion 77 of the feed gear 71 on the lift chassis 5 repeatedly engages with and disengages from the projections 80 at the front ends of the trays 78 with the rise of the lift chassis 5. However, since there is a clearance between the toothless portion 77 and the projection 80 in engagement therewith as seen in FIG. 14, the feed gear 71 will not be caught by the tray 78, permitting the lift chassis 5 to move smoothly.

After the lift chassis 5 has been positioned in place, the tray is fed, the disc is clamped and prevented from slipping off, and the reproduction unit 31 operates for signal reproduction in the same manner as already described.

When no instruction is given for reproducing the signals from another disc after one disc has been played, the lift chassis 5 is lowered to the lowermost position, and the tray box 27 can be then discharged. More specifically, from the state shown in FIG. 5, the drive slide 8 is driven in the direction of arrow C, and the drive slide 9 in the direction of arrow C', whereby the pins 6, 6, 7 through the drive slides 8, 9 are fitted into the horizontal portions continuous with the slanting slits 12, 12, 13 without moving the lift chassis 5.

With the movement of the drive slide 9, the pivotal lever 16 shown in FIG. 3 is moved counterclockwise. The cam face 16a of the lever 16 therefore pushes the pin 90 to move the lock lever 89 counterclockwise against the spring 93, whereby the engaging portion 91 of the lock lever 89 is moved out of the recessed portion 27a of the tray box 27 to unlock the box 27. Consequently, the tray box 27 is pushed toward the discharge direction by the pivotal lever 85 biased by the spring 86.

With the disc player described above, the slanting slits 12, 12, 13 in the drive slides 8, 9 are straight, so that the pins 6, 7 on the lift chassis 5 can be driven without any marked change in the load to move the lift chassis 5 stepwise smoothly. The slanting slits 12, 12, 13 are each formed at one end with the horizontal portion for discharging the tray. The drive slides 8, 9 can therefore be of a shorter length than the conventional drive slides formed with steplike slanting slits, consequently shortening the dimension of the disc player in the direction along the slides.

Although the drive gear 15 on the main chassis 1 is brought out of meshing engagement with the rack gear 14 of the drive slide 9 when the lift chassis 5 is to be held at a specified level, the engaging portion 18b of the small gear portion 18 of the drive gear 15 comes into intimate contact with the rack gear 14 between the first ridges 14a, 14a to lock the rack gear 14, thereby preventing the movement of the drive slides 8, 9. Consequently, the lift chassis 5 can be held properly at the specified level.

The present invention is not limited to the the foregoing embodiments but can be modified variously within the technical scope of the invention.

For example, the drive mechanism for discharging the tray box 27 may comprise a pivotal arm 94 operatively associated with the drive slide 8 as seen in FIGS. 17 to 20. Stated more specifically, the pivotal arm 94 is supported by a pivot 97 on the bottom plate of the main chassis 1, and the drive slide 8 is provided with a projection 8a at its one end. The pivotal arm 94 has at its opposite ends pins 95 and 96 opposed to the projection 8a and the tray box 27, respectively. When the drive slide 8 is driven from the position in FIG. 17 to the position in FIG. 18, the projection 8a pushes the pin 95 to move the arm 94 counterclockwise. With this movement, the pin 96 on the arm 94 pushes the tray box 27 toward the discharging direction.

The tray box 27 can be discharged with good stability by this arrangement regardless of the number of discs accommodated in the tray box 27, i.e., of the weight of the box 27.

Figure 20:
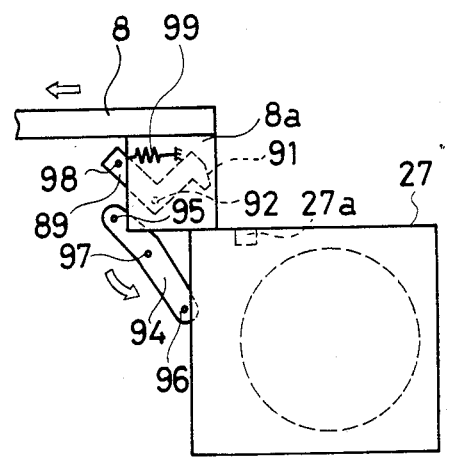
FIG. 20 is a rear view showing a tray box lock lever as coupled to the drive slide according to another embodiment.
Figure 21:
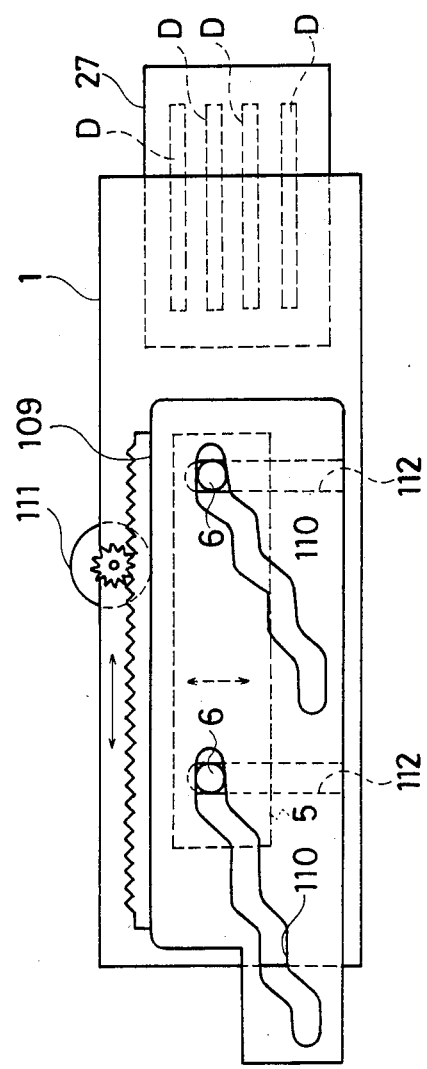
FIG. 21 is a side elevation showing a conventional disc player.

Further with reference to FIG. 20, the lock lever 89 can be adapted to disengage from the tray box 27 by a pin 98 mounted on the lock lever 89 and in engagement with the projection 8a on the drive slide 8. The drive slide 8, when moved, moves the lock lever 89 counterclockwise, disengaging the engaging portion 91 from the recessed portion 27a of the tray box 27.

Figure 17:
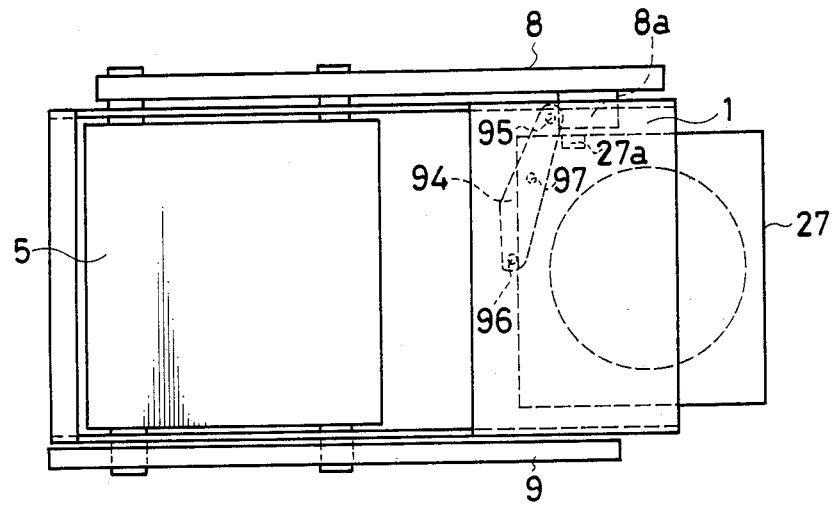
FIG. 17 is a rear view showing a tray box discharge mechanism included in another embodiment immediately before its discharge operation.
Figure 18:
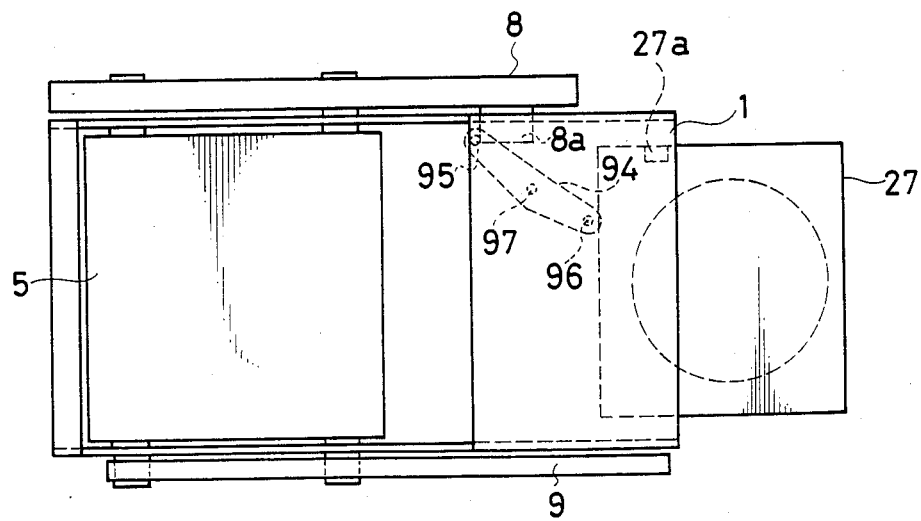
FIG. 18 is a rear view showing the tray box discharge mechanism of FIG. 17 upon completion of the discharge operation.
Figure 19:
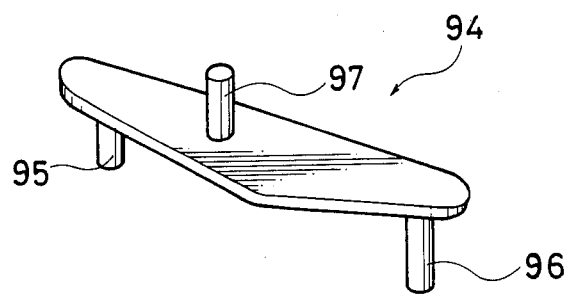
FIG. 19 is a perspective view of a pivotal arm included in the tray box discharge mechanism.

The arrangement shown in FIGS. 17 and 18 has the drawback that since the drive slide 8 is moved stepwise, the tray box 27 is discharged by an intermittent movement. It is desirable that the drive slide be driven continuously during the discharge of the tray box 27. FIG. 6B shows gear means constructed from such viewpoint. The small gear portion 18 has an auxiliary ridge 18d at an intermediate position in the cutout 18b. On the other hand, the rack gear 14 is formed with third ridges 14c along with first ridges 14a at the gear terminal end portion (section Q shown). The auxiliary ridge 18d has such a length as to engage only with the third ridge 14c. Accordingly, when the small gear portion 18 is in mesh with the rack gear 14 in the section P shown, the auxiliary ridge 18d of the small gear portion 18 is held out of engagement with the second ridge 14b, so that the portion 18 idly rotates between two adjacent first ridges 14a, 14a, whereby the rack gear 14 can be advanced stepwise in the same manner as already stated. On the other hand, when the gear portion 18 is in mesh with the rack gear 14 in the section Q, the auxiliary ridge 18d engages with the third ridge 14c on the rack gear 14 without permitting the idle rotation of the gear portion 18 to continuously drive the rack gear 14. The tray box 27 can be discharged through a continuous movement when the section Q is provided at the portion of the drive slide 8 which contributes to the discharge of the tray box.

What is claimed is:

1. A disc player including a lift chassis 5 liftably supported on a main chassis 1 and having a signal reproduction unit 31 mounted on the lift chassis, and a drive slide 9 supported by the main chassis 1 and movable in a direction intersecting the direction of movement of the lift chassis 5, the drive slide 9 being formed with a cam portion in engagement with a cam follower provided on the lift chassis 5, the drive slide 9 being drivingly movable in reciprocation to thereby move the lift chassis 5 stepwise, the disc player being characterized in that the cam portion of the drive slide 9 extends straight, an intermittent feed mechanism being provided between the drive slide 9 and a motor 23 for reciprocatingly moving the drive slide, the intermittent feed mechanism comprising a drive portion for continuously receiving rotation from the motor 23 and a driven portion to be intermittently driven by the drive portion, the drive portion having an engaging portion engageable with the driven portion to lock the driven portion while idly rotating without transmitting power to the driven portion.

2. A disc player as defined in claim 1 wherein the main chassis 1 is removably loaded with a tray box 27 having a plurality of trays 78 accommodated therein in a multiplicity of stages.

3. A disc player as defined in claim 1 wherein the drive portion of the intermittent feed mechanism has a solid cylindrical body, the outer peripheral surface of the body being formed with gear grooves 18a with a predetermined pitch, the outer peripheral surface being provided between the gear grooves with the engaging portion 18c formed by a cylindrical surface and with a circumferential cutout 18b along the engaging portion, the driven portion of the intermittent feed mechanism being formed with first ridges 14a engageable in the gear grooves 18a in the drive portion and arranged along the drive slide 9 with a predetermined pitch, the driven portion having second ridges 14b formed between the first ridges 14a and fittable in the cutout 18b of the drive portion with a specified amount of play, the drive portion being idly rotatable within the range of the play of the second ridge 14b while the second ridge 14b moves from one end of the cutout 18b to the other end thereof, the engaging portion 18c of the drive portion being engageable with the driven portion between the first ridges 14a, 14a to lock the driven portion during the idle rotation.

4. A disc player as defined in claim 1 wherein the drive portion of the intermittent feed mechanism is fixedly provided with a drive gear 15 drivingly rotatable by the motor 23, and the position of the reproduction unit 31 is detected by detecting the rotational angle of the drive gear 15.

5. A disc player as defined in claim 4 wherein the rotational angle of the drive gear 15 is detectable by means comprising a slit 19 formed in an outer peripheral portion of the drive gear 15 and an optical sensor 25, the sensor 25 comprising a light-emitting element and a photodetector disposed on the opposite sides of the outer peripheral portion of the drive gear 15.

6. A disc player as defined in claim 5 wherein the slit 19 is so positioned that the sensor 25 produces a pulse signal when the drive portion of the intermittent feed mechanism discontinues power transmission to the driven portion.

7. A disc player as defined in claim 2 wherein each of the trays 78 in the tray box 27 is provided with a rack gear 14 at one side thereof, and the lift chassis 5 is provided with a feed gear 71 meshable with the rack gear 14 to withdraw the tray 78 from the tray box 27, the feed gear 71 being coupled to a motor 58 mounted on the lift chassis 5.

8. A disc player as defined in claim 7 wherein the rack gear 14 has a projection 80 at one end thereof, and the feed gear 71 is formed with a toothless portion 77 engageable with the projection 80, the feed gear 71 being movable with the lift chassis 5 to a specified level with the toothless portion in engagement with the projection 80 to select the specified tray 78.

9. A disc player as defined in claim 7 wherein the lift chassis 5 is provided with a tray slipping preventing mechanism 32 comprising a cam slide 38 drivingly movable by the motor 58 during the transport of the tray 78, and holding members 44, 45 positionable over the upper side of the disc with the movement of the cam slide 38.

10. A disc player as defined in claim 7 wherein the lift chassis 5 is provided with positioning means engageable with the tray 78 withdrawn from the tray box immediately before the tray 78 is set in position for biasing the tray 78 toward the set position with a spring.

11. A disc player as defined in claim 7 wherein the lift chassis 5 is provided with a cam gear 69 drivingly rotatable by the motor 58, and a clamp lever 64 movable by engagement with the cam gear 69, the clamp lever 64 being provided at its forward end with a clamp member 63 for rotatably supporting thereon the disc on the tray 78, and the clamp member 63 lifts the disc off the tray 78 after the tray 78 has been set in position to press the disc against a turntable 35 drivingly rotatable by a spindle motor 34.

12. A disc player as defined in claim 2 wherein the drive slide 9 has coupled thereto a tray box discharge mechanism for moving the tray box 27 in a discharge direction.

13. A disc player as defined in claim 12 wherein the drive slide 9 performs a first movement for moving the lift chassis 5 to its lowermost position and a second movement continuous with the first movement and not contributing to the driving of the lift chassis 5, and the tray box discharge mechanism operates with the second movement.

14. A disc player as defined in claim 13 which is provided with means for continuously moving the drive slide 9 during the second movement of the drive slide 9.

15. A disc player as defined in claim 13 wherein the tray box discharge mechanism is provided with means engageable with the tray box 27 in its completely loaded position to lock the tray box and spring means for biasing the tray box 27 toward the discharge direction, and the lock means is unlocked with the second movement of the drive slide 9.

16. A disc player as defined in claim 13 wherein the tray box discharge mechanism is provided with means engageable with the tray box 27 in its completely loaded position to lock the tray box and a pivotal arm 94 for forcibly pushing the tray box 27 toward the discharge direction, and the lock means is unlocked and the pivotal arm 94 is driven in the tray box discharge direction with the second movement of the drive slide.

17. A disc player as defined in claim 2 wherein the main chassis 1 and the lift chassis 5 are respectively provided with a first contact piece and a second contact piece projecting toward each other for registering the front ends of the trays 78.

* * * * *